Sept. 23, 1924.  
E. GRUENFELDT  
1,509,507

AUTOMATIC WELDING MACHINE

Filed May 6, 1921

Inventor  
E. Gruenfeldt  
By Lloyd L. Evans  
Attorney

Patented Sept. 23, 1924.

1,509,507

UNITED STATES PATENT OFFICE.

EMIL GRUENFELDT, OF CLEVELAND, OHIO, ASSIGNOR TO THE HYDRAULIC STEEL COMPANY, OF CLEVELAND, OHIO, A CORPORATION OF OHIO.

AUTOMATIC WELDING MACHINE.

Application filed May 6, 1921. Serial No. 467,391.

*To all whom it may concern:*

Be it known that I, EMIL GRUENFELDT, a citizen of the United States, residing at Cleveland, in the county of Cuyahoga and State of Ohio, have invented a certain new and useful Improvement in Automatic Welding Machines, of which the following is a full, clear, and exact description, reference being had to the accompanying drawings.

This invention relates to the welding of circumferential seams of barrels or other cylindrical objects.

The object of the invention is to obtain a uniform weld throughout the extent of such a seam regardless of irregularities in the cylindrical contour of the object or in the meeting edges thereof at the seam.

In the drawing forming a part of this specification,

Figure 1:
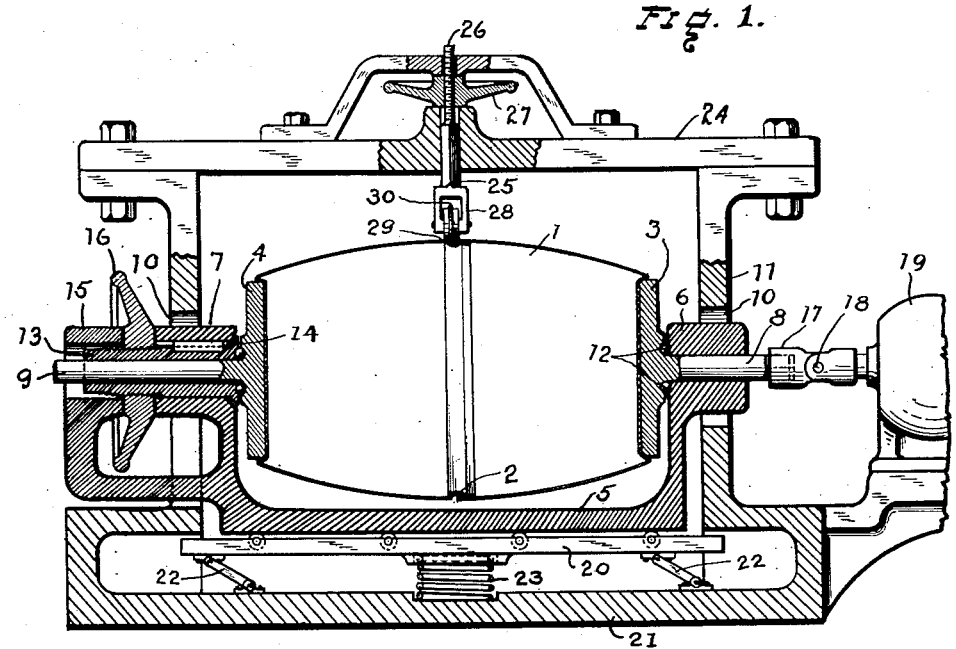
Figure 1 is a side view of the machine partly broken away to show certain of the parts in section.

The barrel 1 to be welded along a central circumferential seam 2 is rotatably supported between a pair of chucks 3 and 4. The chucks 3 and 4 are rotatably mounted in bearings carried by a floating frame 5. The floating frame 5 has a pair of upwardly extending bearing arms 6 and 7 through which the shafts 8 and 9 of chucks 3 and 4 extend. The arms 6 and 7 slidably engage slots 10 in the main supporting frame 11 which permit limited movement of the frame 5, both vertically and horizontally. A thrust bearing 12 is interposed between the chuck 3 and the bearing arm 6. The bearing arm 7 has keyed therein a hollow threaded shaft 13 which receives the shaft 9 of the chuck 4 and has a thrust bearing 14 interposed between it and the chuck 4. The bearing arm 7 carries an extension 15 forming a backing for an adjusting nut 16 engaging the threaded hollow shaft 13. By means of the adjusting nut 16 the chuck 4 can be forced toward the chuck 3 to firmly clamp the barrel 1. The shaft 8 carried by the chuck 3 is connected through a slip joint 17 and a flexible joint 18 with the driving shaft of a suitable driving mechanism 19.

The floating frame 5 is supported for longitudinal movement upon a vertically movable roller bed 20. The roller bed 20 is connected to the base 21 of the frame through opposite pairs of parallel links 22. The bed 20 is yieldingly supported upon a coil spring 23 seated on the base 21.

Mounted in the upper cross bar 24 of the frame is an adjustable spindle 25 having a threaded upper end 26 engaged by an adjusting nut 27. The lower end 28 of the spindle 25 is forked and has mounted therein a roller 29 which has a projecting rib 30 engaging the grooved seam 2.

Figure 2:
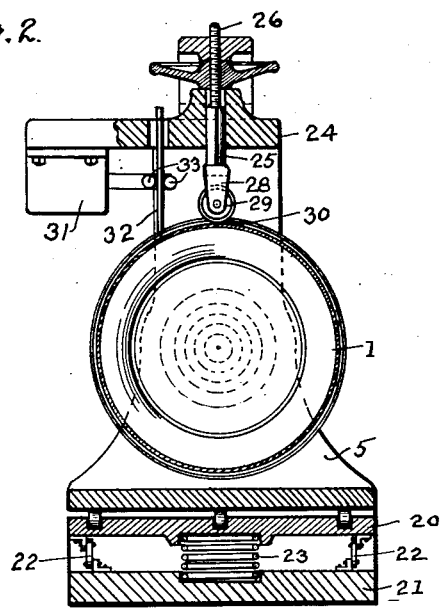
Figure 2 is a central transverse vertical section.

Adjacent the adjustable seam engaging roller is mounted a welding head 31, preferably of the automatic arc welding type, in which the electrode 32 is fed to the work by feed rollers 33, as shown diagrammatically in Fig. 2 of the drawing.

In operation the barrel is inserted between the chucks 3 and 4 with the seam 2 in engagement with the roller 29 and the chuck 4 adjusted by means of the nut 16 to clamp the barrel in place. The roller 29 may then be adjusted to force the barrel and its supporting frame 5 downwardly against the action of the spring 23 until the desired upward thrust against the roller 29 is effected. The driving mechanism 19 is then put in operation to rotate the barrel.

In forming barrel tubs such as shown herein to be joined together along a central seam it has been found that such tubs are not uniformly of true circular shape at their edges and furthermore such edges do not always lie exactly in a plane perpendicular to the axis of the tub. It has been found in welding such seams that these irregularities cause imperfections in the welded joint, due to the fact that certain portions of the seam are not properly alined with the welding device, and due to variations in the distance between the welding device and seam.

By the present invention both the above mentioned difficulties are avoided. As the barrel 1 rotates, presenting successive portions of the seam to the electrode 32, the rib 30 of the roller 29 holds the seam adjacent the electrode in alinement therewith moving the barrel 1 and its supporting frame 5 bodily on the roller bed 20 to maintain the portion of the seam being welded in line with the electrode 32. The spring 23 presses the top of the barrel against the roller 29 so that the portion of the seam being welded is maintained at a substantially uniform distance from the end of the electrode.

What I claim is:

1. In a welding machine, a stationary welding device, a rotary support for an article having a circumferential seam to be welded, means for rotating the article to present successive portions of the seam to the welding device, said rotary support being mounted for vertical and horizontal movement, and stationary means adjacent said welding head to position said seam with respect to said welding device.

2. In a welding machine, a welding device, a pair of rotary clamping devices for holding an article having a circumferential seam, means for rotating said clamping devices to present successive portions of the seam to the welding device, a support for said clamping devices permitting horizontal and vertical movement thereof and means engaging said seam adapted to move said article vertically and horizontally to maintain the portion thereof being welded in a predetermined spaced relation with respect to the welding device.

3. In a welding machine, a welding device, means for movably supporting an article having a seam to be welded, means for moving said support to present successive portions of the seam to said welding device, and means adjacent the welding device and engageable with said seam adapted to move said article bodily vertically or horizontally to maintain the portion of the seam being welded in definite spaced relation with respect to the welding device.

4. In a barrel welding machine, a welding device, a pair of opposed rotary and slidably mounted chucks for engaging the heads of the barrel, means for rotating said barrel to present successive portions of the circumferential seam thereof to said welding device, and means engageable with the seam adjacent said welding device adapted to bodily shift the barrel to maintain the portion of the seam being welded in alinement with said welding device.

In testimony whereof, I hereunto affix my signature.

EMIL GRUENFELDT.